(12) United States Patent
Rigner et al.

(10) Patent No.: US 6,325,411 B1
(45) Date of Patent: Dec. 4, 2001

(54) SUSPENSION DEVICE

(75) Inventors: Lars Rigner, Särö ; Tore Fosse, Göteborg, both of (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/194,851

(22) PCT Filed: Apr. 29, 1997

(86) PCT No.: PCT/SE97/00714

§ 371 Date: Dec. 3, 1998

§ 102(e) Date: Dec. 3, 1998

(87) PCT Pub. No.: WO97/46424

PCT Pub. Date: Dec. 11, 1997

(30) Foreign Application Priority Data

Jun. 6, 1996 (SE) .................................... 9602259

(51) Int. Cl.⁷ .................................................. B60R 21/16
(52) U.S. Cl. ...................................... 280/731; 280/728.2
(58) Field of Search ................................ 280/728.2, 731, 280/732, 728.1

(56) References Cited

U.S. PATENT DOCUMENTS 5,024,464   6/1991   Kawaguchi et al. ................. 280/731
5,383,682 * 1/1995   Nagata et al. ....................... 280/731
5,593,178 * 1/1997   Shiga et al. ......................... 280/731

FOREIGN PATENT DOCUMENTS

0572125   * 12/1993   (EP) ..................................... 280/731
0 636 808 A1   2/1995   (EP) .
4-143143   *  5/1992   (JP) ..................................... 280/731
6-270817   *  9/1994   (JP) ..................................... 280/731
96/24511 A2   8/1996   (WO) .

* cited by examiner

Primary Examiner—Kenneth R. Rice
Assistant Examiner—Lynda Jasmin
(74) Attorney, Agent, or Firm—Kilpatrick Stockton LLP

(57) ABSTRACT

Apparatus is disclosed for suspending an airbag module with respect to a steering wheel in a vehicle. The apparatus includes a steering wheel console mounted on the steering wheel, an elastic attenuating body mounted on both the airbag module and the steering wheel console for attenuating vibration therebetween, and an anchor extending through an aperture in the steering wheel console at an angle and rigidly mounted with respect to the airbag module, so that the anchor guides the airbag module in a predetermined direction during inflation of the airbag.

9 Claims, 4 Drawing Sheets

SUSPENSION DEVICE

TECHNICAL FIELD OF THE INVENTION

The present invention relates to a device for suspending a mobile module in a motor vehicle, according to the preamble of appended claim 1. In particular, the invention relates to a device in which an airbag module in the steering wheel device of the vehicle is adjusted to function as a tuned vibration attenuator.

BACKGROUND OF THE INVENTION

Modern motor vehicles are often equipped with at least one airbag in order to protect those travelling in the vehicle. In a known manner, this airbag is arranged to, in case of a collision with the vehicle, be activated by means of an acceleration sensor and to be inflated by means of a gas generator, so that gas flows into the airbag which is then formed to a soft cushion which suppresses the forward motion of the person travelling in the vehicle. As regards the driver of the vehicle, he is normally protected by means of an airbag which is arranged in the hub of the steering wheel of the vehicle. For this purpose, an airbag module which comprises the airbag and the gas generator used for inflating the airbag can be arranged in the hub of the steering wheel.

When the engine idles the steering wheel normally vibrates at a certain frequency, which frequency is ca. 30–40 Hz in modern vehicles. If an airbag module of the above-mentioned kind is arranged in the steering wheel, a considerable weight is added, which might cause the natural frequency of the steering system of the vehicle to decrease. In case of unfavourable circumstances which i.a. depend on the choice of idling rpm of the engine, the natural frequency can interact with the idling frequency of the engine, thus causing greatly amplified vibrations in the steering wheel.

These amplified vibrations are naturally perceived as something negative by those travelling in the vehicle, in particular by the driver of the vehicle since he is holding the wheel.

There is thus a need for an improved suspension of an airbag module arranged in the steering wheel of a vehicle which enables the vibrations in the steering system and the wheel to decrease. In particular, it is desirable to ensure that the frequency of resonance for the airbag module does not coincide with the vibration frequency at the idling rpm of the vehicle.

The airbag module is furthermore arranged to activate an airbag in a predetermined manner. In particular, it is necessary for the airbag, when triggered, to be inflated in a well defined direction relative to the person intended to be protected. A drawback of known suspension devices for airbag modules is that there is a risk that the airbag is inflated somewhat obliquely, e.g. in the wrong direction relative to the person. As a result, the airbag will not have the intended protective effect. For this reason, there is a need for devices which provide a correct guidance of the airbag when inflating.

A previously known device which relates to a suspension device for an airbag module is shown in patent document U.S. Pat. No. 5,024,464. This device comprises an airbag module which is arranged at a steering wheel via an elastic organ. The airbag module then functions as a vibration attenuator which causes a reduction of the vibrations in the steering wheel. The elastic organ comprises a stop element in the shape of a stud, around which an elastic casing-like element is arranged. The stop element prevents the airbag module from moving upwards more than a certain distance.

SUMMARY OF THE INVENTION

A main object of the present invention is to solve the above-mentioned problem, and to provide an improved device which in particular is intended for vibration attenuating suspension of a mobile module, preferably an airbag module in a steering wheel device in a motor vehicle. This is obtained by means of a device of the initially mentioned kind, the characteristics of which will become evident from appended claim 1.

A further object of the invention is to provide a device for correct guidance of an airbag module when inflating an airbag. This object is obtained by means of a device, the characteristics of which will become evident from appended claim 14.

The invention is intended for the suspension of a mobile module, e.g. an airbag module, relative to a steering wheel device in a motor vehicle and comprises an attenuating element for the attenuation of vibrations, which attenuating element in turn comprises a body of elastic material which is fixedly attached to a part of said module, and which is fixedly attached to said steering wheel device. In this way, efficient attenuation of vibrations is enabled, as is a simple fitting of the module in the steering wheel device. In particular, the area, the thickness, the shearing module and similar parameters of the element can be controlled, so that the airbag module vibrates in counter-phase relative to the vibrations of the steering system, which causes reduced vibrations in the steering wheel. The vibration frequency of the airbag module can be tuned by choice of material and elastic properties of the attenuating element.

In particular, the frequency of resonance of the airbag module is prevented from coinciding with the idling rpm of the vehicle. In this way, the airbag module can be made to function as a tuned vibration attenuator, which vibrates in counter-phase relative to the rest of the steering wheel device, thus reducing vibrations.

The term "steering wheel device" here relates not only to the steering wheel as such, but also to its corresponding parts in the wheel/steering system of the vehicle, e.g. the hub of the wheel, the spokes and the console parts.

Advantageous embodiments will become evident from the appended dependent claims.

BRIEF DESCRIPTION OF THE FIGURES:

The invention will in the following be described in greater detail with reference to the appended drawings, in which.

PREFERRED EMBODIMENTS

Figure 1:
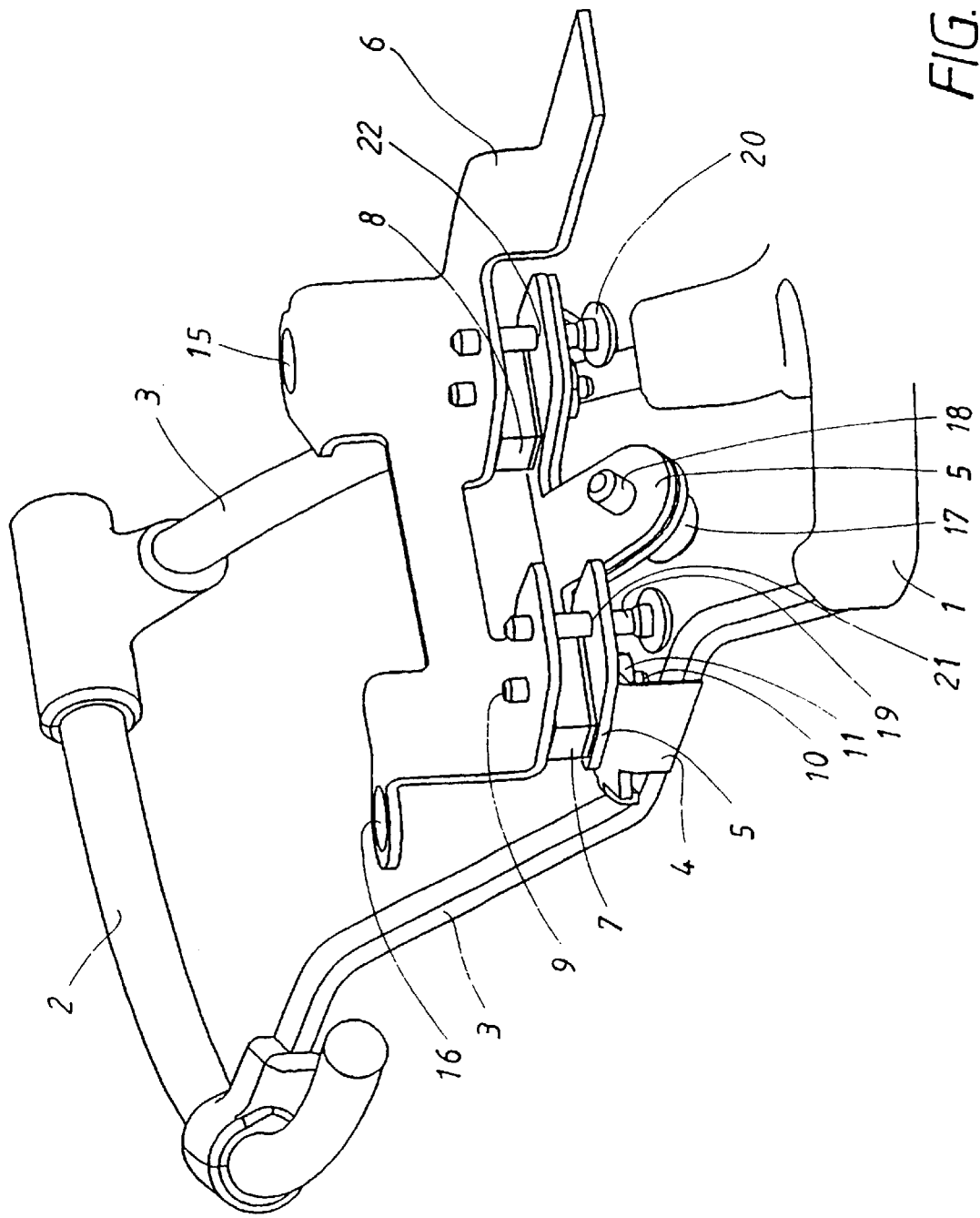
FIG. 1 is a perspective view of a device for the suspension of an airbag module according to the present invention.

FIG. 1 shows a somewhat simplified perspective view of a device according to the present invention. The invention is in particular intended to be utilized in connection with motor vehicles, for the suspension of a mobile component in the form of an airbag module at the steering wheel device of the vehicle. Thus, FIG. 1 shows a steering wheel hub 1 at which a steering wheel 2 is arranged. The steering wheel 2 is fitted to the hub 1 via a plurality of spokes 3. A steering wheel console 4 is fixedly arranged at one or more of the spokes 3 of the wheel. As seen in FIG. 1, the steering wheel console 4 extends between two spokes 3. It should however be pointed out that the steering wheel 2 can support two or more steering wheel console parts, which can be fitted in a similar manner as the steering wheel console which is shown with the reference numeral 4 in FIG. 1. Furthermore, the amount of spokes of the wheel 2 can vary, but is preferably two to four.

On top of the steering wheel console 4, there is arranged an airbag console comprising a first console part 5 and a second console part 6. Between the first console part 5 and the second console part 6, there are arranged two elastic attenuating elements 7, 8 which preferably are made from an energy absorbing visco-elastic material, e.g. rubber. The function of the elements 7, 8 will be described in greater detail below. In the figure, two elements 7, 8 are shown which are fitted to the steering wheel console 4, but according to the embodiment a total of four elements are provided, where two elements are arranged on either side of the steering wheel hub 1 (i.e. two of the elastic elements cannot be seen in FIG. 1).

Figure 2:
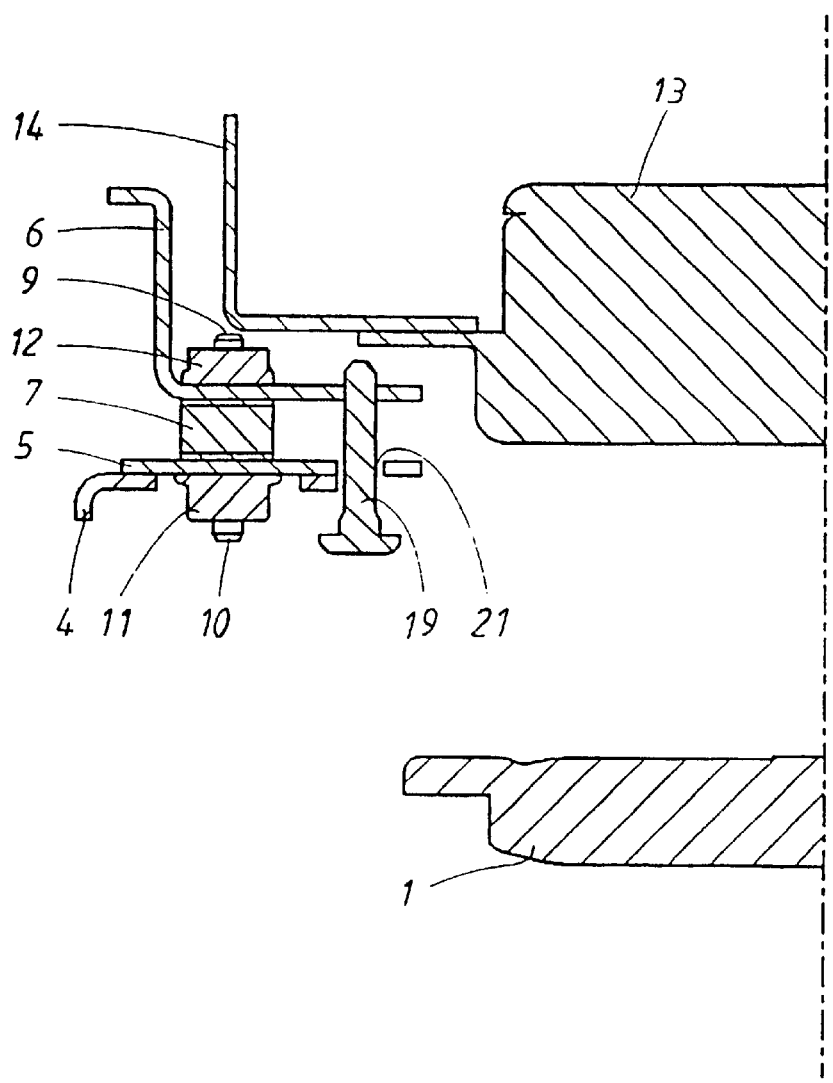
FIG. 2 is a view of a cross-section of the device according to FIG. 1.

With reference to FIG. 2 which is a cross-section of the invention seen through the elastic element 7, it will become apparent that the element 7 is fitted between the first console part 5 and the second console part 6. For this purpose, the console parts 5, 6 comprise through-going holes (not shown), through which are arranged two attachment elements of the element 7, which preferably are screws 9, 10, one upper and one lower. The screws 9, 10 are fixed between the console parts 5, 6 by means of two nuts 11, 12, which are screwed onto the screws 9, 10, respectively.

The airbag console 5, 6 further supports an airbag module 13, which in a conventional manner comprises a gas generator which is arranged to inflate a (not shown) airbag. The airbag module 13 is connected, in a known manner, to an acceleration sensor for the detection of a collision-like state. In case of such a state, the gas generator in the airbag module 13 will thus be activated in order to inflate the airbag. Furthermore, the airbag module 13 (not shown in FIG. 1) is suspended in such a manner that it rests on the console part 6. For this purpose, the airbag module 13 is connected to a console part 14 which is intended to be connected to the console part 6, to be more exact at two attachment points 15, 16.

As can be seen in FIG. 1, the invention comprises an attachment device in the form of a screw 17 with a corresponding nut 18, by means of which the steering wheel console 4 and the first console part 5 can be attached to each other. The screw 17 is arranged to extend through (not shown) holes in the console parts 4, 5 and to be fixed by means of the nut 18. When fitting the entire device, the airbag module 13 is, preferably in advance, fitted to the console part 14 which in turn is fitted to the console part 6. Furthermore, the elastic elements 7, 8 are arranged in advance between the console parts 5, 6. When fitting the entire steering wheel system including the airbag module 13, it is only necessary for the airbag module and the various console parts 14, 5, 6 to be aligned so that the screw 17 can be fixed. This provides a very simple and time saving fitting procedure.

In case of the airbag being triggered, e.g., in case of a collision, the airbag will be inflated in a direction away from the steering wheel. During inflation, the attachment of the airbag module 13 will be affected by heavy forces. In particular, the elastic elements 7, 8 will be affected and stretched. In order to prevent the airbag module from breaking away from its attachment to the console part 5, the invention is provided with two anchors 19, 20 which are both fixedly attached to the second console part 6 in the immediate vicinity of the elastic elements 7, 8, respectively. The number of anchors can vary, but preferably four anchors are utilized, of which two anchors 19, 20 can be seen in FIG. 1. The anchors 19, 20, respectively comprise an upper cylindrical part which is connected to a lower hat-shaped end part. The respective cylindrical parts extend through holes 21, 22 which are made in the first console part 5. The holes 21, 22 are somewhat larger than the diameter of the cylindrical part of the anchors 19, 20, respectively. To be more exact, the holes 21, 22 are preferably of such a size that during normal operation there is no contact between the holes 21, 22 and the anchors 19, 20. The anchors 19, 20 are furthermore screwed onto the second console part 6. The hat-shaped end part of the respective anchor 19, 20 are stop elements which prevent the airbag module 13 from being moved more than a predetermined maximal distance in a direction away from the steering wheel hub 1, i.e., the stop element prevents the airbag module 13 from breaking away and moving in a direction upwards according to FIG. 2.

It should be pointed out that said predetermined maximal distance exceeds the highest permitted amplitude of vibration of the elements 7, 8, respectively during normal use of the device. If the airbag module 12 has been moved said predetermined distance, this will normally correspond to the elements 7, 8, respectively having been so stretched that they have been so deformed as to be unusable.

When triggered, the airbag is furthermore intended to assume a predetermined position relative to a person. In this way, the person can be protected in an optimal manner in case of, for example, a collision. In order to control the direction of inflation for the airbag, i.e. so that it assumes a correct position relative to the person, the anchors 19, 20 and their corresponding holes 21, 22 serve to guide the airbag during the inflating process. For this purpose, the diameter of the holes 21, 22 is somewhat larger than the diameter of the cylindrical parts of the anchors 19, 20. The holes 21, 22 are preferably of such a size that contact with the cylindrical parts of the anchors 19, 20 does not occur during normal operation, i.e. when driving and when idling. Furthermore, the diameter of the holes 21, 22, respectively, is adjusted according to the permitted inclination of the anchors 19, 20, which in turn defines a certain sector relative to the longitudinal axis of the steering wheel axis, within which the airbag can be inflated.

Figure 3:
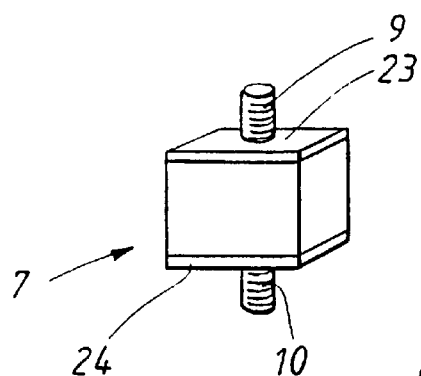
FIG. 3 is a perspective view of an attenuating element which is used in the present invention.

FIG. 3 shows an elastic element intended to be utilized in connection with the invention. Although the drawing shows an element 7 in the shape of an essentially cubical block, it can also have another shape, e.g. cylindrical. The element 7 is preferably made from elastic natural rubber which has energy-absorbing and elastic properties. Alternatively, other kinds of synthetic rubber can be used, for example silicon rubber or the like. The rubber block has elastic properties both in the vertical and the horizontal direction. If necessary, the elastic properties in the horizontal directions can be made different from the elastic properties in the vertical direction. The element 7 is equipped with an upper washer 23, which is of an essentially square shape, and which serves as an attachment for the upper screw 9. The element 7 furthermore comprises a lower washer 24 which serves as an attachment for the lower screw 10. The screws 9, 10 are arranged essentially diametrically opposite to each other on the elastic block, thus defining a longitudinal axis along which the airbag module 12 can be moved.

With reference to FIGS. 1 and 2, it can be seen that the airbag module 13 is elastically suspended relative to the rest of the steering wheel device. Through a suitable choice of stiffness for the elastic elements 7, 8, these will, in combination with the rest of the airbag module 13 form a vibration attenuator which reduces vibrations in the rest of the steering wheel system. In particular, the elements 7, 8 can be shaped so that the airbag module 13 is brought to vibrate in counter-phase to the rest of the steering wheel device at the idling rpm of the engine, which minimizes the vibrations in the steering wheel.

According to alternative embodiments, the elastic elements 7, 8 can be fixed between the console parts 5, 6 (see FIG. 1) by means of gluing or vulcanizing. In this case, the element 7 is shaped without the screws 9, 10 and without the above described washers 23, 24.

Figure 4:
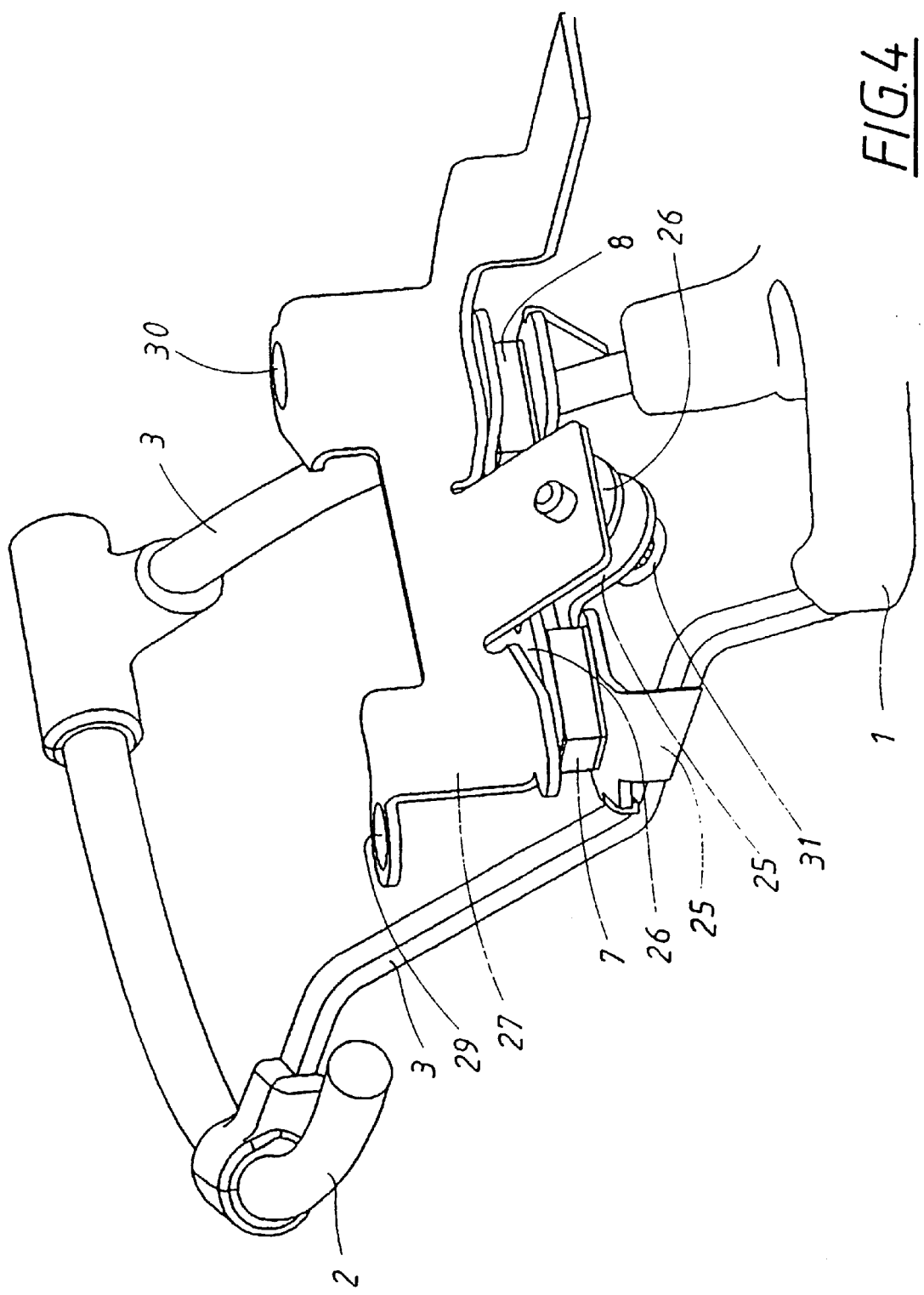
FIG. 4 is a perspective view of the suspension of an airbag module according to an alternative embodiment of the invention.

FIG. 4 shows an alternative embodiment of the present invention. The components which correspond to the components shown in FIGS. 1–3 have, for reasons of clarity, been given the same reference numerals. The embodiment according to FIG. 4 comprises a steering wheel console which extends between two spokes 3, and which in turn comprises a first steering wheel console part 25 and a second steering wheel console part 26. Between the steering wheel console parts 25, 26 there are arranged two elastic elements 7, 8. Furthermore, there is an additional airbag console 27 arranged on top of the second steering wheel console part 26.

According to the embodiment, the elastic elements 7, 8 are of a kind which does not comprise any screws for their fitting. Instead, the elements 7, 8 are arranged so that they are fixed between the console parts 25, 26 by means of vulcanizing or a corresponding method.

Figure 5:
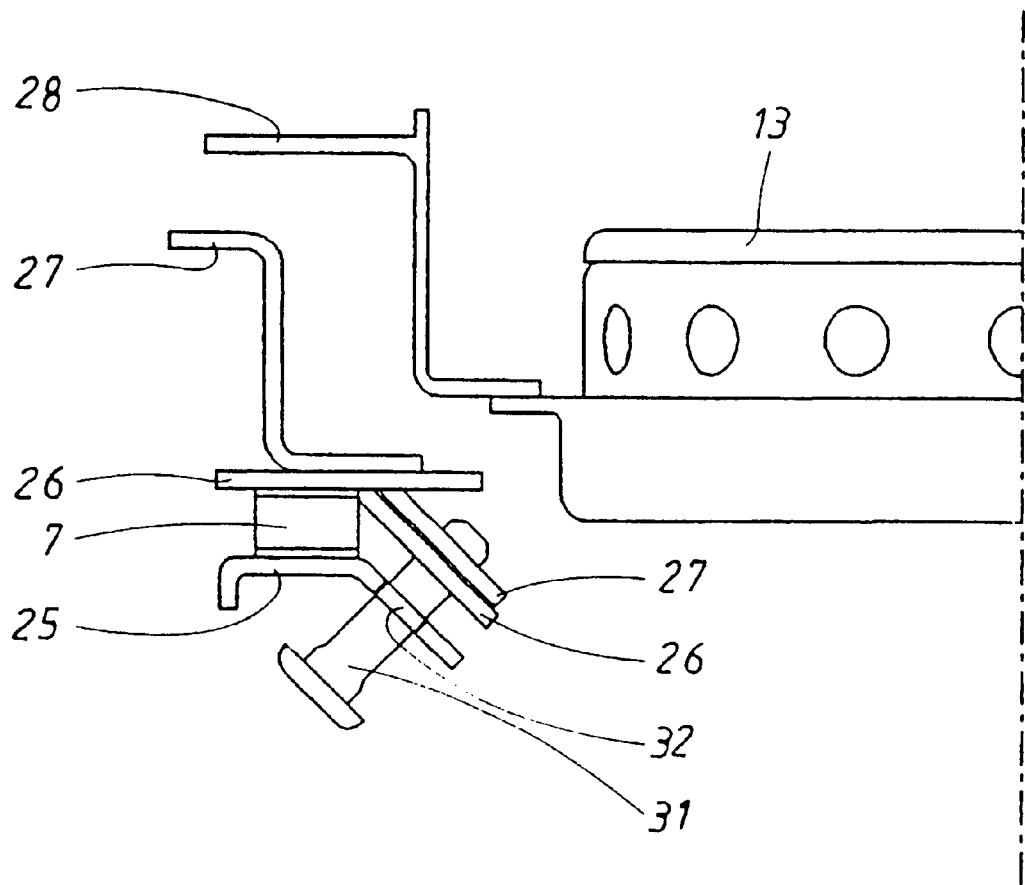
FIG. 5 is a side view, partially in cross-section, of the device according to the embodiment shown in FIG. 3.

As can be seen in FIGS. 4 and 5, the airbag module 13 is fitted to an additional console part 28, which in turn is intended to be attached at two attachment points 29, 30 in the airbag console 27. Furthermore, an anchor 31 is arranged for attachment of the airbag console 27 to the steering wheel console part 26, and for guiding the airbag module 13 when its airbag is triggered. For this purpose, the anchor 31 is arranged to extend freely through a hole 32 in the first steering wheel console part 25. The lower part of the anchor 31 is shaped with a hat-shaped end part with a larger diameter than the rest of the anchor 31. In a manner which corresponds to the above-described embodiment, the anchor 31 constitutes a stop which limits the movement of the airbag module 13 in the axial direction of the anchor 31. Furthermore, the anchor 31 serves to guide the airbag module 13 in a predetermined direction when triggering the airbag, in a manner corresponding to that which has been described above.

The entire device is fitted as follows: First of all the elastic elements 7, 8 are fitted in advance between the console parts 25, 26. The airbag module 13 is attached to the console part 28, which in turn is attached to the airbag console 27. The airbag console 27 is fixed to the console part 26 by means of the anchor 31. The anchor 31 for this purpose comprises screw and nut elements which are screwed together. Furthermore, the anchor 31 extends through a hole 32 which is made in the console part 25.

The invention is not limited to the embodiments shown, but can be varied within the scope of the appended claims. For example, different kinds of materials and dimensions for the elements 7, 8 can be utilized. Furthermore, the invention can in principle be used for the suspension of other mobile devices in the steering wheel hub than an airbag module, for example the horn.

The elements 7, 8 can be attached in many different manners, e.g. screws and bolts, studs, clips, vulcanizing, gluing or the like.

In an alternative embodiment, the anchors 19, 20 and 31 respectively, can be utilized regardless of the presence of elastic elements in order to prevent the airbag module 13 from breaking away from its attachment, and for guiding the airbag in the desired direction. In this embodiment, the elements 7, 8 are thus not used.

What is claimed is:

1. Apparatus for suspending an airbag module with respect to a steering wheel in a vehicle comprising:

a steering wheel console mounted on said steering wheel, said steering wheel console including at least one aperture, an elastic material body mounted on said airbag module and said steering wheel console for attenuating vibrations therebetween;

at least one anchor extending through said at least one aperture in said steering wheel console at a predetermined angle and rigidly mounted with respect to said airbag module, said at least one aperture being dimensioned with respect to said predetermined angle of said at least one anchor whereby said at least one anchor guides said airbag module in a predetermined direction during inflation of said airbag module; and a first attachment member for rigidly mounting said elastic material body with respect to said airbag module and a second attachment member for rigidly mounting said elastic material with respect to said steering wheel console.

2. The apparatus of claim 1 wherein said first and second attachment members comprise screws arranged diametrically opposite to each other with respect to said elastic material body.

3. The apparatus of claim 1 wherein said at least one anchor includes a stop surface for preventing said airbag module from moving more than a predetermined distance with respect to said steering wheel console during inflation of said airbag module.

4. The apparatus of claim 3 wherein said predetermined distance exceeds the largest permitted amplitude of vibration of said elastic material body during its normal use.

5. The apparatus of claim 1 wherein said at least one aperture has a dimension corresponding to a predetermined maximum inclination angle for said anchor.

6. Apparatus for suspending an airbag module with respect to a steering wheel in a vehicle comprising:

a steering wheel console mounted on said steering wheel, said steering wheel console including at least one aperture, an elastic material body mounted on said airbag module and said steering wheel console for attenuating vibrations therebetween, wherein said elastic material body is rigidly mounted with respect to said airbag module and with respect to said steering wheel console by means of gluing or vulcanizing; and at least one anchor extending through said at least one aperture in said steering wheel console at a predetermined angle and rigidly mounted with respect to said airbag module, said at least one aperture being dimensioned with respect to said predetermined angle of said at least one anchor whereby said at least one anchor guides said airbag module in a predetermined direction during inflation of said airbag module.

7. Apparatus for suspending an airbag module with respect to a steering wheel in a vehicle comprising:

a steering wheel console mounted on said steering wheel, said steering wheel console including at least one aperture, an elastic material body mounted on said airbag module and said steering wheel console for attenuating vibrations therebetween;

at least one anchor extending through said at least one aperture in said steering wheel console at a predetermined angle and rigidly mounted with respect to said airbag module, said at least one aperture being dimensioned with respect to said predetermined angle of said at least one anchor whereby said at least one anchor guides said airbag module in a predetermined direction during inflation of said airbag module; and a first mounting member attached to said airbag module and a second mounting member attached to said steering wheel console wherein said elastic material body is mounted between said first and second mounting members.

8. The apparatus of claim 7 wherein said elastic material body is produced from material having properties such that said airbag module vibrates substantially in counter phase to said steering wheel console during idling of said vehicle.

9. The apparatus of claim 1 wherein said elastic material body possesses elastic properties in both the longitudinal and latitudinal directions.

* * * * *